US010540135B1

(12) United States Patent  
Fitzgerald et al.

(10) Patent No.: US 10,540,135 B1  
(45) Date of Patent: *Jan. 21, 2020

(54) MULTI-PANEL, MULTI-COMMUNICATION VIDEO WALL AND SYSTEM AND METHOD FOR SEAMLESSLY ISOLATING ONE OR MORE PANELS FOR INDIVIDUAL USER INTERACTION

(71) Applicant: PanoScape Holdings, LLC, Elmhurst, IL (US)

(72) Inventors: Jeremiah Fitzgerald, Elmhurst, IL (US); Matthew Mascheri, Elmhurst, IL (US); John Clarke, Elmhurst, IL (US)

(73) Assignee: PanoScape Holdings, LLC, Elmhurst, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,425

(22) Filed: Jun. 23, 2019

Related U.S. Application Data

(63) Continuation of application No. 16/114,425, filed on Aug. 28, 2018, now Pat. No. 10,372,402.

(Continued)

(51) Int. Cl.
| | |
|---|---|
| *H04N 5/445* | (2011.01) |
| *H04N 9/12* | (2006.01) |
| *G06F 3/14* | (2006.01) |
| *H04N 5/232* | (2006.01) |
| *H04N 5/44* | (2011.01) |
| *G06K 9/00* | (2006.01) |
| *G06F 3/044* | (2006.01) |
| *G06F 3/01* | (2006.01) |

(52) U.S. Cl.
CPC ............ *G06F 3/1446* (2013.01); *G06F 3/044* (2013.01); *G06K 9/00288* (2013.01); *G06K 9/00362* (2013.01); *H04N 5/23238* (2013.01); *H04N 5/4403* (2013.01); *G06F 3/017* (2013.01); *G06K 2009/00322* (2013.01); *H04N 2005/443* (2013.01)

(58) Field of Classification Search
CPC ............ H04N 5/23238; H04N 5/4403; H04N 5/44591; H04N 5/445; H04N 2005/443; G06F 3/1446; G06F 3/044; G06F 3/017; G06F 3/1423; G06F 3/1431; G06K 9/00288; G06K 9/00362; G06K 2009/00322; G09G 2300/026
USPC ......... 348/383, 563, 564, 588, 739; 345/1.1, 345/1.3, 30
See application file for complete search history.

(56) References Cited

U.S. PATENT DOCUMENTS

| | | |
|---|---|---|
| 6,118,433 A | 9/2000 | Jenkin et al. |
| 6,680,714 B2 | 1/2004 | Wilmore |

(Continued)

*Primary Examiner* — Sherrie Hsia
(74) *Attorney, Agent, or Firm* — Kaspar Law Company, LLC; Scott R. Kasper (57) ABSTRACT

A multi-panel video wall and system is disclosed having a computer with a memory or access to a public or private cloud containing a video file and a processor for executing the video file and a plurality of video display screens interconnected to one another and to the computer via wired or wireless transmission, each of the plurality of video display screens configured to work together to display a video content generated from the video file that extends across all of the plurality of video display screens. Upon user interaction or detection of a user, one or more of the plurality of video display screens seamlessly transitions away from the video content to display a separate video content for interaction with the user.

16 Claims, 8 Drawing Sheets

Related U.S. Application Data

(60) Provisional application No. 62/648,913, filed on Mar. 27, 2018, provisional application No. 62/669,334, filed on May 9, 2018, provisional application No. 62/672,097, filed on May 16, 2018.

(56) References Cited

U.S. PATENT DOCUMENTS

| | | |
|---|---|---|
| 7,082,398 B1 | 7/2006 | Apple et al. |
| 9,148,614 B2 | 9/2015 | Szolyga et al. |
| 9,535,649 B2 | 1/2017 | Cope et al. |
| 9,741,316 B2 | 8/2017 | Loeffler et al. |
| 9,811,303 B2 | 11/2017 | Choi |
| 9,824,624 B2 | 11/2017 | Howard et al. |
| 9,854,613 B2 | 12/2017 | Son |
| 9,911,176 B2 | 3/2018 | Griffin et al. |
| 9,911,243 B2 | 3/2018 | Vats |
| 9,911,396 B2 | 3/2018 | Chen et al. |
| 9,917,866 B2 | 3/2018 | Zhang et al. |
| 2006/0028398 A1 | 2/2006 | Willmore |
| 2012/0038561 A1 | 2/2012 | Han |
| 2015/0286456 A1 | 10/2015 | Griffin et al. |
| 2016/0132174 A1 | 5/2016 | Yoo et al. |
| 2016/0162245 A1 | 6/2016 | Choi |
| 2016/0162247 A1 | 6/2016 | Bryczkowski |
| 2016/0266860 A1 | 9/2016 | Nam |
| 2016/0306603 A1 | 10/2016 | Nadeson |
| 2016/0358582 A1 | 12/2016 | Lee et al. |
| 2017/0060319 A1 | 3/2017 | Seo et al. |
| 2017/0206854 A1 | 7/2017 | Erhart |
| 2018/0052652 A1 | 2/2018 | Kim et al. |
| 2018/0059774 A1 | 3/2018 | Lee et al. |

MULTI-PANEL, MULTI-COMMUNICATION VIDEO WALL AND SYSTEM AND METHOD FOR SEAMLESSLY ISOLATING ONE OR MORE PANELS FOR INDIVIDUAL USER INTERACTION

CROSS-REFERENCE TO RELATED APPLICATIONS

This application is a continuation of, and claims the benefit of priority to, U.S. patent application Ser. No. 16/114,425 filed Aug. 28, 2018 (now U.S. Pat. No. 10,372, 402), which claims the benefit of priority to U.S. Provisional Patent Application No. 62/648,913 filed Mar. 27, 2018, U.S. Provisional Patent Application No. 62/669,334 filed May 9, 2018, and U.S. Provisional Patent Application No. 62/672, 097 filed May 16, 2018, each of which is incorporated by reference herein in its entirety.

TECHNICAL FIELD

The present invention relates to a video wall and system, and more particularly, a plurality of display screens forming a panoramic video wall, each display of which can seamlessly transition to a stand-alone basis for individual user interaction.

BACKGROUND

There exists in the art video walls, including panoramic video walls, that are comprised of a plurality of display screens or panels. The display screens or panels work together to display one video instance that extends across the screens to create a video wall or panoramic effect.

Many of the conventional video walls are comprised of touch-screen displays, which are configured to interact with a person through capacitive means when the person touches the screen, such as with a human finger or a stylus. In this manner, a person can interact with the touch-screen video wall by touching an area of the display screens, which often times triggers a dialogue box or separate window to launch.

One example of a prior art video wall system utilizing touch-screen displays is the Accenture Interactive Network located in the American Airlines terminal at O'Hare International Airport in Chicago, Ill. The Accenture Interactive Network is a video wall comprised of nine touch-screen displays, which allows one or more users to interact with the video wall at the same time. The display screens forming the Accenture Interactive Network all work together, displaying the same video output relating to a single executable file, and when one or more users interacts with the Accenture Interactive Network, the users are interacting with the same executable file, which causes certain windows and/or interactive imagery to be displayed on a portion of one or more display screens located proximate to the user. But at no time during the user interaction does any one of the nine display screens transition away from the video wall presentation and act independently to display separate content.

None of the prior art video walls provides for display screens that can seamlessly transition away from the singular video wall experience to provide a user with a unique interactive environment displayed only on the screen in which the user is physically interacting, through touch-screen or other means.

SUMMARY OF THE INVENTION

According to one non-limiting aspect of the present disclosure, an example embodiment of a multi-panel video wall and system for seamlessly isolating one or more panels for individual user interaction is disclosed. The exemplar system includes a computer with a memory or access to a public or private cloud containing a video file and a processor for executing the video file and a plurality of video display screens interconnected to one another and to the computer via wired or wireless transmission, each of the plurality of video display screens configured to work together to display a video content generated from the video file that extends across all of the plurality of video display screens. Upon user interaction or detection of a user, one or more of the plurality of video display screens seamlessly transitions away from the video content to display a separate video content for interaction with the user.

According to another non-limiting aspect of the present disclosure, an example embodiment of a method for seamlessly isolating one or more panels of a multi-panel video wall for individual user interaction is disclosed. The method includes the steps of providing a computer having a memory containing a video file and a processor for executing the video file, the computer being interconnected with the plurality of video display screens and having an Internet connection for accessing a remote Javascript database; displaying a video content across all of the plurality of video display screens, the video content generated from the video file; detecting a user interacting with one of the plurality of video display screens and seamlessly transitioning said one of the plurality video display screens from the video content to a separate video content for interaction with the user; and displaying the separate interactive video content on said one of a plurality of video display screens interacting with the user.

According to yet another non-limiting aspect of the present disclosure, another example embodiment of a method for seamlessly isolating one or more panels of a multi-panel video wall for individual user interaction is disclosed. The method includes the steps of providing a computer having a memory containing a video file and a processor for executing the video file, the computer being interconnected with the plurality of video display screens and having an Internet connection for accessing a remote Javascript database; providing at least one camera operatively connected to one or more of the video display screens; displaying a video content across all of the plurality of video display screens, the video content generated from the video file; detecting a user interacting with one of the plurality of video display screens and further detecting one or more physical characteristics relating to the user; identifying a separate video content for displaying to the user based on one or more of the detected physical characteristics of the user; seamlessly transitioning said one of the plurality video display screens from the video content to the separate video content for interaction with the user; and displaying the separate interactive video content on said one of a plurality of video display screens interacting with the user.

Additional features and advantages are described herein, and will be apparent from the following Detailed Description and the figures.

BRIEF DESCRIPTION OF THE DRAWINGS

Features and advantages of the multi-panel video wall and system and method for seamlessly isolating one or more panels for individual user interaction described herein may be better understood by reference to the accompanying drawings in which.

The reader will appreciate the foregoing details, as well as others, upon considering the following Detailed Description of certain non-limiting embodiments of the multi-panel video wall and system according to the present disclosure. The reader may also comprehend certain of such additional details upon using the multi-panel video wall and system described herein.

DETAILED DESCRIPTION

The present disclosure, in part, is directed to a multi-panel video wall and system and method for seamlessly isolating one or more panels for individual user interaction. The novelty of the present invention is demonstrated by the fact that: (1) it was awarded and named "Best New Interactive Digital Signage Product" at the 2018 Digital Signage Exposition (DSE 2018), held Mar. 28-29, 2018, at the Las Vegas Convention Center, in Las Vegas, Nev.; (2) it was awarded and named a finalist for the "AV Awards 2018" in the "Interactive Display Product of the Year" category by AV Magazine on Jul. 23, 2018; and (3) it was awarded and named "Best New Digital Signage Product" at the 2019 Interactive Customer Experience (ICX) Awards on Jun. 4, 2019, in Dallas, Tex.

Figure 1:
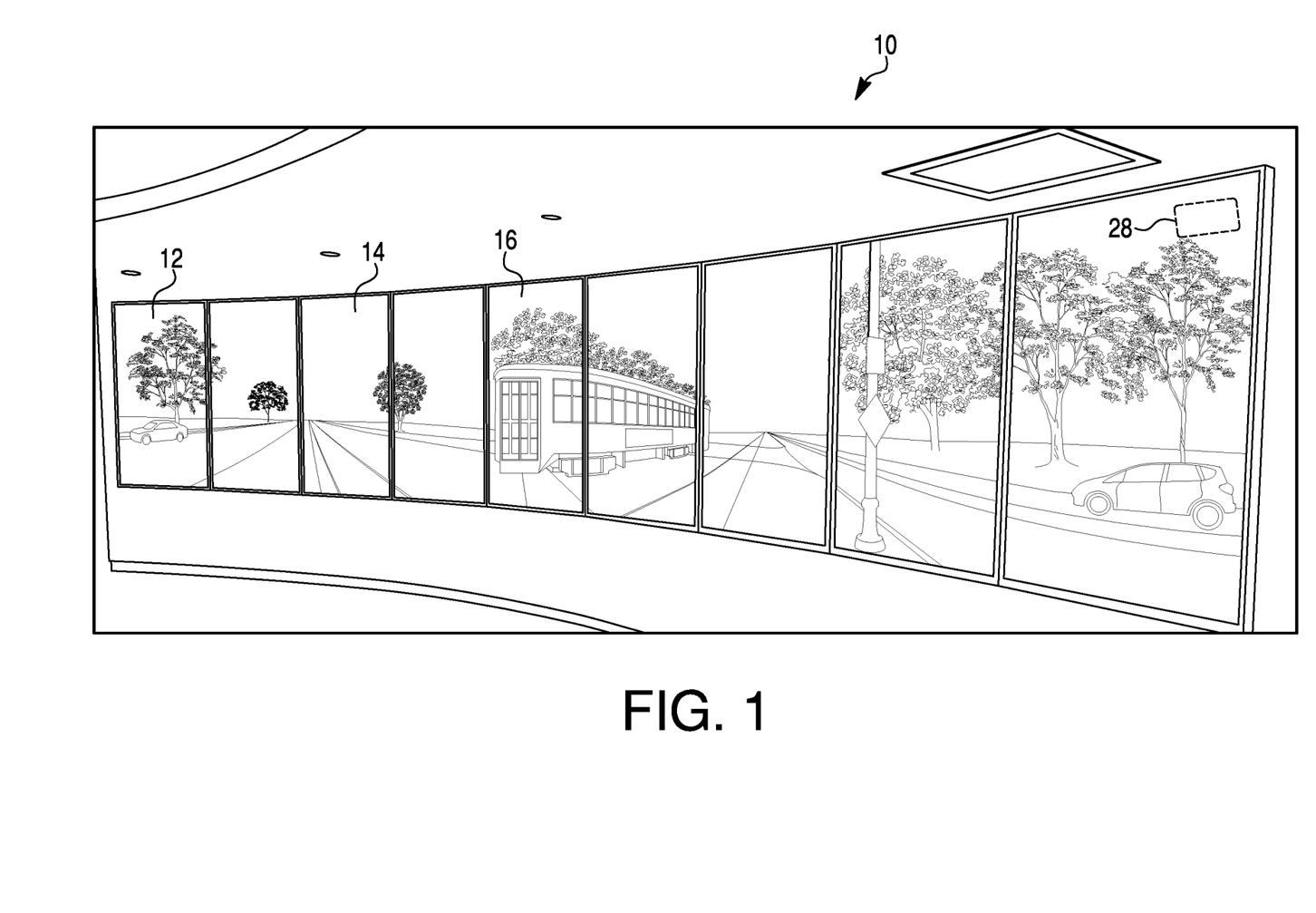
FIG. 1 depicts an exemplar multi-panel video wall system, in which all of the display panels are working together to display one panoramic video.

As shown in FIG. 1, a panoramic video wall (10) is shown in which a plurality of video displays (12, 14, 16) are working together to display one video image. In the instance shown in FIG. 1, nine display screens are utilized, each display screen being a touch-screen display. Any number of touch-screen displays can be utilized, though current practical limitations on resolution and processing speeds dictates that a video wall should have no more than 18 such display screens. Those skilled in the art will appreciate that future improvements in display screens, including resolution, as well as computer processing speeds and capabilities may allow for video walls to be comprised of more than 18 display screens.

Display screens may be of a touch-screen display, utilizing capacitive or other technology that receives user input through physical touch, such as with a human finger or a stylus. The display screens also may be LED panels, or potentially could be one large LED display in which separate content may be displayed on different portions of the panel. Alternatively, the display screen may utilize other sensing technologies, such as infrared/depth sensing camera detection (e.g., Leap Motion, Inc.'s Leap Motion® controller), gesture registration, motion sensing, facial recognition, depth sensing, or near field communication. An example of a particular make and model of touch-screen display that would be suitable with a video wall of the present disclosure is the Elo® 7001LT. Such a display screen typically has a diagonal dimension of about 70 inches and a High Definition (HD) resolution of 1920×1080. Many such display screens are powered by a light-emitting diode (LED) panel, with a brightness of about 700 nits. A panoramic video wall as shown in FIG. 1 with nine such display screens, therefore, would have an overall length of about 27 feet, with a resolution up to about 20,000 by 4,000 (20K×4K) that can be displayed, although in many typical applications, the resolution is 9720×1920 (10K×2K).

Figure 2:
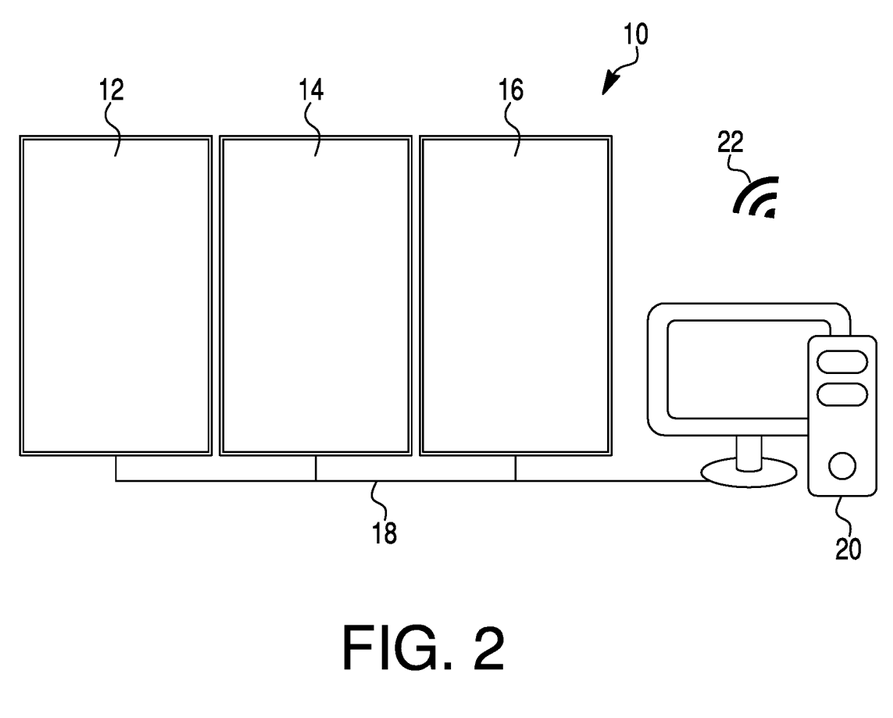
FIG. 2 depicts a schematic view of the exemplar multi-panel video wall system shown in FIG. 1.

As shown in FIG. 2, a panoramic video wall (10), such as that disclosed in FIG. 1, comprises one or more display screens (12, 14, 16) interconnected with one another via cabling (18) and with a computer (20) or other electronic device containing a central processing unit for processing one or more executable files stored in a memory. Computer (20) also may be connected to a public or private cloud, or other Internet based database, for downloading and/or updating the executable files stored locally or for storing the executable files in the cloud. Cabling (18) may be any suitable cable capable of transmitting audio and video signals, including (but not limited to) HDMI, USB, VGA, or Ethernet cabling, or any other such cabling configured to connect with HDMI, USB, VGA, or Ethernet ports of a computer. Alternatively, the display screens may be interconnected to the computer (20) via wireless network (22), such as through a wi-fi network, or through wireless transmission, such as via Bluetooth® transmission. Computer (20) is any standard microprocessor capable of providing audio and video signals to the display screens of the video wall (10). One example of computer (20) is a Dell® professional desktop computer having a processor and graphics card sufficient to control a multi-panel video wall. Preferably, computer (20) has a Matrox C900 graphics card, or any such graphics card of similar or better capabilities. Alternatively, computer (20) may be a tablet, phone, or other electronic device capable of providing audio and video signals to the display screens of the video wall (10), including (but not limited to) an AppleTV®, Roku®, Hulu®, or Amazon® Fire Stick® transmitter, or through any such electronic device configured to transmit streaming media, such as those configured for AppleTV®, Hulu®, Netflix®, and/or Amazon® Fire® networks. Computer (20) also may be comprised of a network hub device, such as Google® Hub® or Amazon® Alexa®, which is connected to the Internet and interacts with streaming services, such as those provided by Google® or Amazon®, as examples.

What is unique about the multi-panel video wall and system (10) of the present disclosure is that an individual display screen (12, 14, 16), or one or more individual display screens, can seamlessly transition from displaying video wall content to acting as a stand-alone screen displaying individual content based on user interaction.

Figure 3:
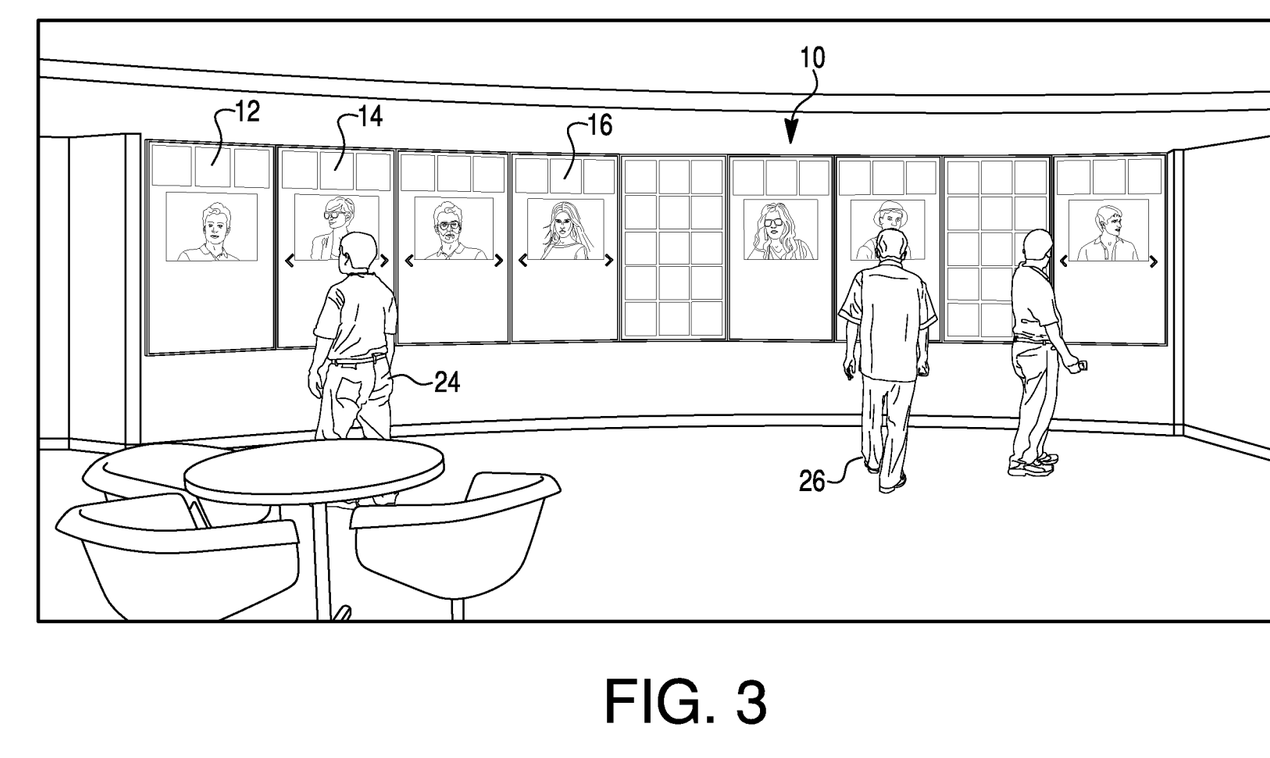
FIG. 3 depicts an exemplar multi-panel video wall system, in which a plurality of users are interacting with the video wall system, thereby causing individual display screens to seamlessly transition away from the video wall and into separate, stand-alone interactive display environments.

As shown in FIG. 3, one or more users (24, 26) initiate user interaction with the video wall (10) by tapping or touching on a particular display screen (12, 14, 16) with a finger or stylus. Alternatively, the display screen may utilize other sensing technologies, such as infrared/depth sensing camera detection (e.g., Leap Motion, Inc.'s Leap Motion® controller), gesture registration, motion sensing, facial recognition, depth sensing, or near field communication. The video wall (10) acknowledges the user's presence and desire to interact with a particular display screen (12, 14, 16) and seamlessly transitions that that particular display screen and/or one or more of the display screens from the video wall content to a stand-alone environment wherein each display screen displays individualized content to the user that is separate and independent from the video content displayed on the remaining display screens of the video wall.

Prior to a user interaction, the video wall (10) is acting in a default or resting mode in which a panoramic video is displayed across all of the display screens. Alternatively, in the default or resting mode, each display screen may be displaying separate or individual content and, upon interaction by a user, all of the display screens of the video wall (10) transition to a panoramic video displayed across all of the screens. The panoramic video is generated from a video file residing on the computer memory that is processed by the computer (20) utilizing a graphics card and graphics application. In one non-limiting embodiment, the video file is compiled using React components, including, for instance, the React JavaScript library. Processing of the video file is accomplished by using a suitable graphics card, and in one non-limiting embodiment, a Matrox® C900 graphics card, or such graphics card of similar capabilities, is used to process the video file. The resulting audio and video signals are then provided to the plurality of display screens (12, 14, 16) via cabling 18, which may include HDMI, USB, and/or Ethernet cables, or through wireless transmission (22).

When a user (24, 26) begins interaction with an individual display screen (12, 14, 16), such as by tapping on the screen, or through any other user detection means as described above, the video wall (10) acknowledges that a user desires to interact with the individual display screen and isolates that particular display screen, or one or more display screens, from the rest of the video wall by seamlessly transitioning the displayed content on that display screen from the panoramic video to an individualized interactive environment. Alternatively, more than one display screen, or all of the display screens of the video wall (10), may transition from the panoramic video to the interactive environment upon user interaction with any one display screen.

In specific, a user presses or taps on any of the display screens (12, 14, 16), thereby activating one or more software scripts, which in turn transform content displayed from the panoramic video to an interactive state. The interactive user environment typically is facilitated by having a front end which displays the imagery to the user and pulls instructions and content from a backend or content management software (CMS) database. In one non-limiting embodiment, the front end is facilitated by a JavaScript library, such as the React application, running on a web browser, such as the Google® Chrome® web browser, though other front end software and/or web browsers may be suitable. The front end software (e.g., React application) pulls instructions and content from the backend, such as Drupal or Symphony, both of which are open source CMS databases. Those skilled in the art will understand that instructions and content may be comprised of JavaScript Object Notation (Json), Extensible Mark-up Language (.xml), Hypertext Preprocessor (PHP) scripting language, object oriented query language such as .QL, Sequel (SQL) formatted components, among others. The instructions and content also may be batched files, or may be executable files, such as any CMS software. The instructions and content may be encrypted or otherwise secured, such as by using secure sockets layer (SSL) protocol. As one particular example, the front end software (e.g., React application) pulls instructions from Node.js, a JavaScript component, through which the CMS (e.g., Drupal, Symphony) serves the content. Then, the CMS pulls from SQL as well as updates from Json databases, all residing in the cloud, which the CMS uses to update the displayed .xml files.

In one non-limiting embodiment, the seamless transition from video wall to an independently-acting, stand-alone display is accomplished by the following steps. First, the CMS software (e.g., Drupal, Symphony) compiles the JavaScript and other components (e.g., Json and SQL databases) from the latest database served by the CMS. Then, the front end software (e.g., React application) pre-loads all content locally onto the computer memory such that the computer (20) locally hosts all content, including both the panoramic video and the interactive environment. The front end software then displays all content on the display screens (12, 14, 16) using a web browser (e.g., Google® Chrome® web browser).

Alternatively, the content may hosted remotely, such as in a public or private cloud or other remote server, which is either downloaded to computer (20) for presentation on video wall (10) or is streamed directly from the cloud or other remote network to the video wall. Live streaming of the video content may be achieved through live streaming protocols such as real-time messaging protocol (RTMP), such as that implemented by Instagram® and other live-video presentation applications, or hypertext live streaming (HLS) implemented by, for instance, AppleTV®.

Presentation of the video wall content may further be achieved by or through the operating system software residing on the display screens (12, 14, 16), which may be pre-loaded with batched or executable files, such as a CMS software, to pull instructions and content from a database (e.g., SQL database) to present the panoramic video and/or interactive user experience on the display screens of video wall (10). In this manner, a computer (20) may not be required to facilitate the processing and execution of the video wall (10) presentations, as the content would be processed and executed by the display screen operating software.

The front end software (e.g., React application) initially displays the interactive content on the display screens (12, 14, 16) upon loading. After a pre-determined amount of time, the front end software enters into a default or "resting state" mode, whereby the panoramic video is displayed across all display screens of the video wall (10). When a user touches any display panel during the resting mode, the CMS software (e.g., Drupal, Symphony) via Node.js instructs the front end software (e.g., React application) to re-enter the interactive state, allowing that particular display screen (or a plurality of display screens) to receive individual user interactions.

Upon a user's (24, 26) completion of individual interaction with a display screen (12, 14, 16), such as by completion and/or submission of a separate program, scripts, and/or prompts or dialogue boxes, or through the timing-out of user interactions, the video wall (10) acknowledges that the user has finished interaction and transitions the display screens of the video wall from the interactive state back to the panoramic video or other resting mode. Alternatively, the particular display screen that the user was interacting with may transition back to the panoramic video or other resting mode, while one or more of the remaining display screens may continue to operate in an interactive mode.

As yet another alternative, the same user deliverable of a videowall seamlessly transitioning into one or more individual user experiences can be accomplished by a second method, in which the computer 20 is running a fully-compiled, executable file. The executable file takes all of the functionality described above but rewrites it as a Chromium-based application, but does not require the use of the Chrome® browser to run. Rather, the executable file may include an independent graphic user interface (GUI) that allows a user to provide certain functionality requirements, which then are carried out by the executable application. The executable file would continue to call on remote libraries and databases, as described above, which may be cloud-based. This could be accomplished by using a .JSON file, which directs the executable application to certain remote databases, such as those which store and/or host the CMS data.

Having an executable application provides at least three benefits. First, the application is more secure, because the code is compiled and safeguarded from user manipulation. Second, the application allows an end-user to have rights to update the remote CMS databases, in which displayed content may be updated or modified by an end-user, which would be carried out completely independently of the executable application. Third, because the executable application is self-contained, it can be packaged as an "app" that is portable and easily downloadable to an operating system platform. In this manner, the executable "app" can be downloaded onto an operating system of a display, as one example, which would then be immediately available for use and interconnection with the display operating software.

Alternatively, the same user deliverable of a videowall seamlessly transitioning into one or more individual user experiences can be accomplished by a third method, in which the computer 20 is running one or more individual instances of the CMS software, such as Drupal or Symphony. In such an alternative embodiment, each individual display screen (12, 14, 16) may be controlled by a separate instance of the video or other file being displayed, which may be a batch file or script (for instance, a batch file that would be processed or rendered by a web browser or other viewer software, such as Google® Chrome® web browser) or an executable file (for instance, an executable file read by the CMS software). When a user (24, 26) engages with a display screen (12, 14, 16), that separate instance acknowledges that the user is seeking to interact with the display screen and provides separate and particularized content to that display screen, based on the user interactive experience.

To facilitate, the panoramic videowall experience, yet another instance of the CMS software (or other batched or executable file) may be opened and running on computer 20. That is, the computer 20 may be running one more instance than the total number of display screens (12, 14, 16). In the embodiment shown in FIG. 1, which is presented for illustrative purposes only, the computer 20 may be running nine individual and separate instances of the batched or executable file to control the individual content presented on each of the display screens. A tenth instance (that is, one instance in additional to the total number of instances running on each of the display screens) may be running on computer 20, and overlaid over the rest, to control the panoramic videowall, or the content intended to be presented over all of the display screens (12, 14, 16). In the particular arrangement shown in FIG. 1, the total number of instances of the batched or executable file running on the computer 20 is ten instances. In an arrangement where there are 18 display screens, the total number of instances of the batched or executable file may be 19, which is one instance for each individual display plus one instance to control the panoramic video or other display across all of the display screens (12, 14, 16).

In order to facilitate this alternative embodiment, a computer 20 having enhanced processing speeds may be necessary in order to facilitate a seamless transition between the panoramic videowall and any one of the individual instances of the batched or executable file running on computer 20 to deliver content to each of the display screens, or to receive input from any peripheral attached to said individual display screen, such as a camera (e.g., 02-series webcam), credit card or magnetic strip reader (MSR), 2-D bar code reader, near field communication and/or radio frequency identification (RFID) reader, finger print reader, EMV (i.e., Europay, Mastercard, Visa) cradle, speech or voice recognition device, among many other peripherals. Processing speeds of computer 20 must be sufficient to accommodate the seamless transition from instance to instance as one or more users (24, 26) interact with the videowall (10) and trigger the effective toggling of instances, from background.

With each display screen (12, 14, 16) comprising the videowall (10) in the alternative embodiment, the particular instance of the batched or executable file driving a specific display screen also controls and sends or receives data from any peripheral attached to or interfacing with that particular display screen. For instance, if that particular display screen includes a camera device configured to attach to the display screen, the instance of the batched or executable file controlling content to that display screen also controls the camera or other peripheral device, and processes the signals received from the peripheral device.

The final instance of the batched or executable file running on computer 20, that is, the tenth instance in a nine-display environment, may control separate content that is displayed across all of the display screens, such as a panoramic videowall content.

Utilizing any of the above three methods, one or more individual display screens, or all of the display screens, or parts thereof, can immediately transition out of the video wall display and be utilized for specific, individualized purposes. For example, if the video wall is displayed in a "fast food" or quick-service restaurant (QSR), all of the displays may work together to broadcast a commercial or panoramic video customized to the particular venue. When a user or customer steps up to one particular display and touches it, that individual display seamlessly transitions away from the video wall to a menu or ordering environment, in which the user can interact with that particular display screen to order food. The remaining display screens comprising the video wall also may transition to the interactive ordering environment, or may continue to display the panoramic video.

If a second user or customer steps up to another video display, then that particular display also may seamlessly transition away from the video wall to another menu or ordering environment, such that two display screens are displaying and running menus and/or ordering content, while the remaining display screens of the video wall continue to display the panoramic video.

If a third user or customer steps up to yet another display screen, then that particular display also may seamlessly transition away from the video wall to another environment. For instance, if the third user is a child, then the third display screen may activate a gaming environment to allow the child the play a video game while his or her parent orders food at another display screen. As these particular display screens provide individualized content, the remaining display screens of the video wall also may transition to an interactive environment, or may continue to display the panoramic video.

The multi-panel video wall (10), such as that shown in FIG. 1, also may be include a so-called "Easter egg," region (28) on one or more display panels (12, 14, 16), in which a user may touch or otherwise engage with to display a separate panoramic video across all of the display screens and/or a separate interactive user experience on one or more stand-alone display screens (12, 14, 16). Specifically, when a user touches or otherwise engages with the Easter egg (28), the front-end software (e.g., React) pulls a separate set of instructions from the back-end software (e.g., Drupal, Symphony), which accesses a separate database (e.g., SQL or other database), thereby allowing a separate panoramic video presentation and/or separate interactive user experience to be displayed on one or more, or all, of the display screens (12, 14, 16).

As shown in FIG. 1, the Easter egg (28) may be located on any one display screen (12, 14, 16) and be used to launch a separate panoramic video across all of the display screens of video wall (10). In this manner, a user (who likely is a custodian or administrator of the video wall) can toggle the video wall (10) from one panoramic video presentation to another panoramic video presentation. This may allow users to toggle between multiple panoramic video presentations, or between a plurality of advertisements, as examples.

Figure 4:
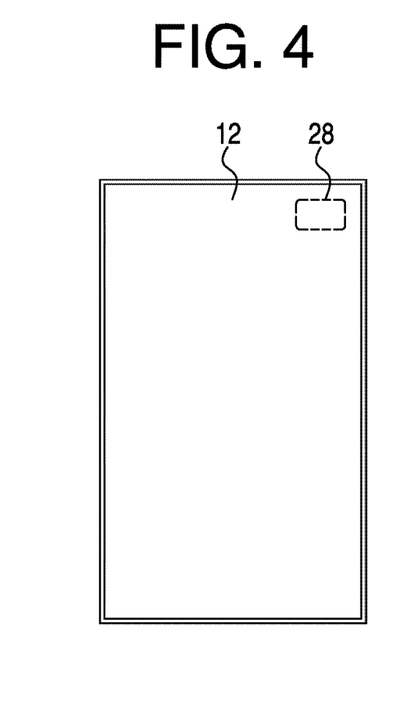
FIG. 4 depicts an exemplar panel of the multi-panel video wall system, in which a region of the panel contains an Easter egg (a hidden non-visible feature) for triggering a separate stand-alone interactive display environment.

As shown in FIG. 4, one or more of the displays screens (12, 14, 16) comprising the video wall (10) may have an Easter egg (28), typically located along an outer edge of the display screen (e.g., top right corner of the screen) for launching a separate interactive user experience. In this manner, a user (who likely is a custodian or administrator) can toggle the individual display screen (12, 14, 16) from one stand-alone interactive user experience, such as a quick-service restaurant (QSR) ordering environment to a gaming environment, as examples. This may allow users to toggle through multiple interactive user experiences on the fly.

Figure 5A:
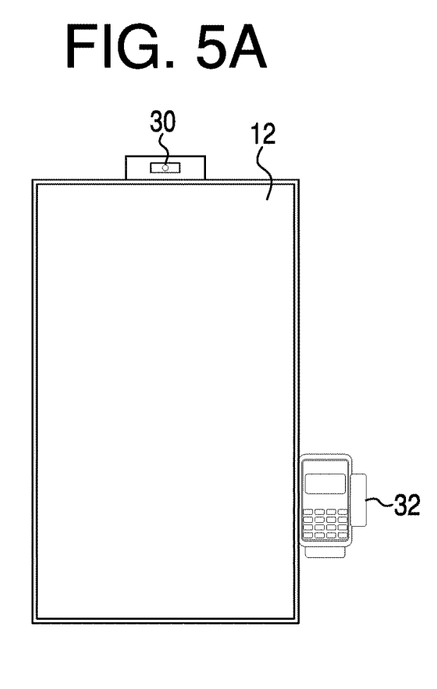
FIG. 5A depicts an exemplar panel of the multi-panel video wall system, in which one or more peripheral devices, such as a camera or credit card reader, are configured to connect with the panel.
Figure 5B:
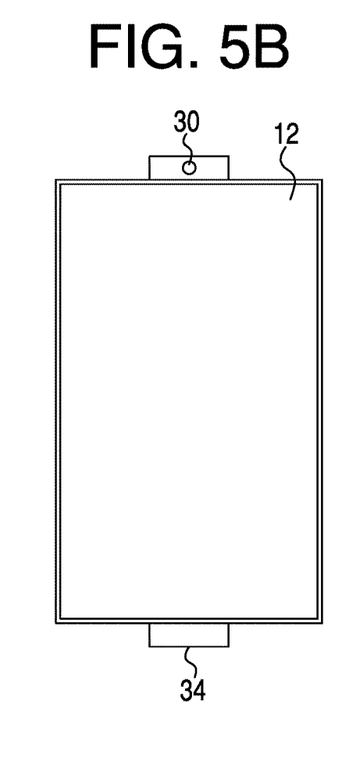
FIG. 5B depicts an exemplar panel of the multi-panel video wall system, in which additional peripheral devices, such as a bar code scanner or near field communication devices, are configured to connect with the panel.

As shown in FIGS. 5A and 5B, one of more display screens (12, 14, 16) of the multi-panel video wall and system of the present invention additionally may be configured with one or more peripheral devices, such as a camera (30) (e.g., 02-series webcam), a credit card or magnetic strip reader (32) (MSR), a 2-D bar code reader (34), near field communication and/or radio frequency identification (RFID) reader, finger print reader, EMV (i.e., Europay, Mastercard, Visa) cradle, speech or voice recognition device, a Leap Motion, Inc.'s Leap Motion® controller or similar infrared proximity sensors or motion detection devices, a printer device for printing customer receipts, among many other peripherals. Camera (30) and a combination MSR (32) and bar code reader (34) are shown in FIG. 5 for exemplary purposes, but any of these peripheral devices may be connected to one or more display screens (12, 14, 16), the input of which may be received by the display screens and/or computer (20). Many of these peripheral devices connect with USB or similar ports located on the top, bottom, and/or sides of the display panels (12, 14, 16), and such a port provides power to the peripheral as well as a data connection. Computer (20) may update or modify the panoramic video presentation and/or one or more stand-alone interactive user environments based on input or data received from a peripheral device, such as will become readily apparent to those of skill in the art based on the examples that follow. Alternatively, the computer (20) may use one or more peripheral devices to identify the user or characteristics of the user (such as age) and restrict or limit video content to that user.

A credit card or MSR (32) may be connected to one or more display screens (12, 14, 16) for allowing a user to pay, such as with an ordering interactive user environment in a quick-service restaurant (QSR) or with a banking or automatic teller environment. Alternatively, near field communication and/or RFID or EMV cradle peripherals may be connected for receiving payment.

A bar code reader (34) may be connected to one or more display screens (12, 14, 16) for allowing a user to scan a bar code, such as that which may be found on an article of clothing, product, or item of food (such as a UPC symbol), or may be found on a government-issued identification card, such as the bar code on the back of a state driver's license. This functionality may be helpful in facilitating certain interactive user environments, such as an on-premise gambling environment.

Camera (30) may be connected to one or more display screens (12, 14, 16) for allowing a user to take digital photographic images, such as a "selfie" or self-portrait. Camera (30) also may be configured to operate with facial recognition software, which may be configured to discern certain characteristics of the user. For example, the facial recognition software may be used for security purposes, to identify the user and then provide that user with certain access based on predefined security clearances. Such an application may be beneficial to a building security system, in which one or more display screens (12, 14, 16) are configured to recognize individuals via camera (30) cleared to access the building, and then are provided access to the building upon recognition. As another example, the facial recognition software may be used for restricting access to certain content displayed on one or more of the display screens (12, 14, 16), such as restricting children from accessing gambling interactive user environments. As yet another example, the facial recognition software may be used for customizing the content displayed on one or more of the display screens (12, 14, 16), or across the entire video wall (10), based on the age, ethnicity or race, and/or gender of the user, as determined by the facial recognition software via camera (30). As one specific example, a video wall (10) located in a sports arena could use facial recognition to determine general characteristics of the audience (such as age, race, and/or gender) and then customize the panoramic video presented across the entire video wall (10) and/or the individual content delivered to one or more display screens (12, 14, 16) based on the input received from the camera (30) and the facial recognition software.

One or more of the peripheral devices may be used to identify the user, or characteristics of the user (such as age, race, and/or gender), and restrict or limit video content to that user accordingly. For instance, a user may present certain credentials, such as an ID badge or card, to a particular peripheral device, and the computer (20) then selects certain video content or an interactive environment to present to that user based on identification of the user or certain characteristics about the user. As one example, a user may need to present a government ID to the video wall (10) in order to gain access to certain content, and the ID would be read by a bar code scanner (34) or a magnetic stripe reader (32). Access to content may be based on the user's security or clearance level within an organization, and the video wall (10) recognizes the user based on an RFID badge using an RFID reader, or by fingerprint using a fingerprint reader connected to the videowall. In this configuration, a user is presented video content or an interactive environment, or restricted from certain content, based on presets or administrative rights set by an administrator of the computer (20) and/or video wall (10). Alternatively, computer (20) may pull content from separate remote databases, depending on the user interacting with the video wall (10). Video wall (10), alone or in tandem with computer (20), may recognize or identify users via any of the peripheral devices connected to the video display screens, including, but not limited to: bar code scanner (34) to read a bar code on a user ID or other card; magnetic stripe reader (32) to read a magnetic stripe on a user ID, credit card, or other card; RFID or near field communication device to read an RFID chip or badge or other devices capable of near field communication, such as smart phones; and facial recognition and/or fingerprint scanners, to detect certain physical characteristics of the user. Those of skill in the art will appreciate that other such technologies may be employed or developed which may permit video wall (10) and/or computer (20) to identify or detect a user or certain characteristics (such as age, race, and/or gender) relating to that user.

Video wall (10) may include a pop-up virtual keyboard. For instance, if a user desires to provide specific information to one or more applications running on the video wall, the user can activate a pop-up virtual keyboard by touching or tapping on a field displayed on the wall. At the instance that the user taps on a portion of a particular display screen, that display screen, displays a standard QWERTY keyboard, which the user can enter letters by touching or tapping on the desired letters.

Video wall (10) also may be configured to work in tandem with a virtual reality goggles or glasses (e.g., Google Glass® virtual reality glasses), such that a user wearing the virtual reality goggles or glasses may see aspects of the video wall in the virtual reality glasses, or may following along remotely with another user interacting with a video wall (10).

Video wall (10), alone or in tandem with computer (20), also may employ speech recognition and speech recognition devices to interact with a user and deliver customized video content or an interactive environment based on a user's speech commands. For instance, video wall (10) may be interconnected with an Amazon® Alexa® network hub, which is capable of receiving input from a user via speech commands and then conducting an Internet search and/or retrieving information via an Internet connection for presentation to the user. In this configuration, a user may be able to request that the speech recognition device, such as an Amazon® Alexa® hub, retrieve and display certain video content or an interactive environment on the video wall (10). Specifically, a user may use certain speech commands (e.g., "Alexa, show me Stonehenge"), and the speech recognition device would retrieve from a remote database via an Internet connection and then display on the video wall (10) certain video content, such as, in this particular example, a panoramic video or image of Stonehenge.

Video wall (10), alone or in tandem with computer (20), also may employ a motion sensor or detector, such as Leap Motion, Inc.'s Leap Motion® controller, to adjust the video content displayed on video wall (10) based on a user's hand gestures or motions. For instance, with a video wall (10) interconnected with a motion sensor or detector, such as Leap Motion, Inc.'s Leap Motion® controller, a user may be able to rotate, resize, or pan certain panoramic videos or images displayed on the video wall (10) by using one or more hands or fingers, the movement of which is captured by a motion sensor or detector (using, for instance, infrared or other proximity sensors) and relayed to video wall (10) and/or computer (20) to adjust or modify the panoramic video or image accordingly.

Video wall (10), alone or in tandem with computer (20), also may employ one or more ultrasonic or hypersonic speakers, to transmit audio to users (24, 26) in a focused beam of sound. In this arrangement, a particular user standing in front of a particular display screen may hear customized sound or audio directed to that user that would not be audible to other users located outside of the range of the ultras or hypersonic speaker. This arrangement may be helpful to provide a particular user with audio or sound relating to the individual user environment or experience, which may not be relevant to other users interacting with other display screens in video wall (10).

One of more ultra or hypersonic speakers may be incorporated or integrated with individual display screens (12, 14) of the video wall (10). For instance, in a video wall (10) comprising 9 display screens, the video wall may have 9 different sets of ultra or hypersonic speakers, each one positioned or located with respect to a separate display screen as necessary to reach a particular user positioned in front of such display screen. Speakers may be incorporated into the display screen, or may be a separate component operatively connected with the display screen. For instance, speakers may have USB connections suitable for interconnection with the USB port of a display screen, as described above with respect to other USB components or peripheral devices.

While those skilled in the art may appreciate that many different speakers may be incorporated with or integrated within one or more display screens (12, 14), one exemplary ultra or hypersonic speaker that may be suitable for interconnection with one or more display screens of video wall (10) includes the Soundlazer® Model # SL-01 open source parametric speaker.

Figure 8:
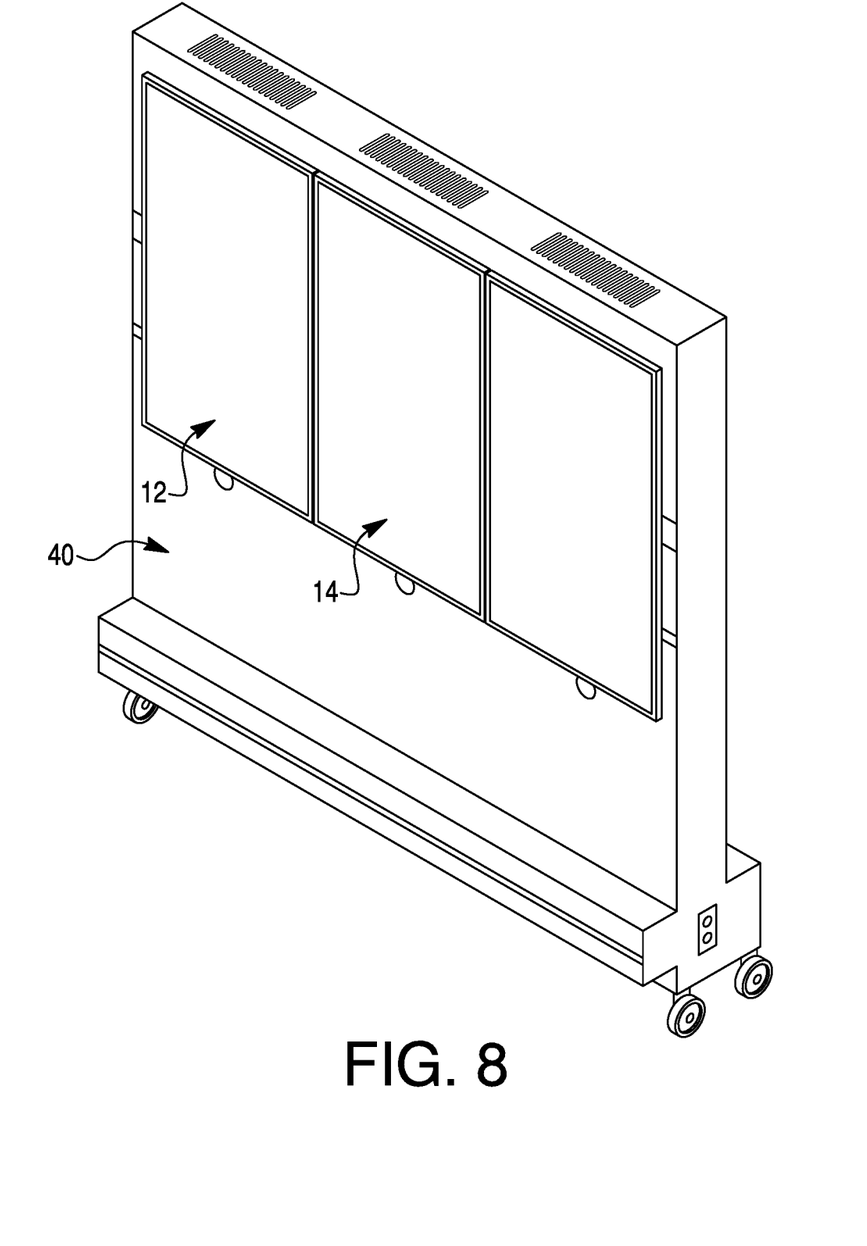
FIG. 8 depicts an exemplar multi-panel video wall system, similar to that generally shown in FIG. 1, as configured for use on a mobile cabinet.
Figure 9:
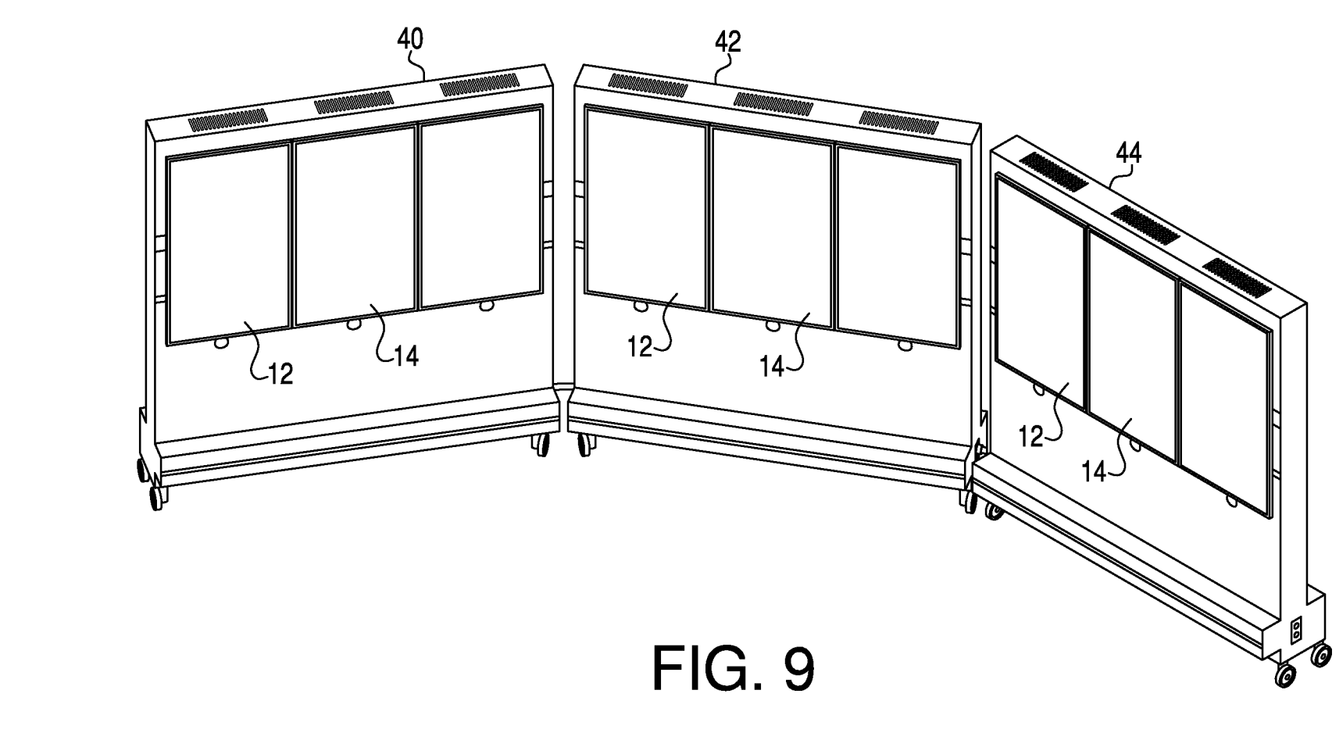
FIG. 9 depicts the exemplar multi-panel video wall system of FIG. 8 when a plurality of mobile cabinets, in this instance three cabinets, are connected to one another.

As shown in FIGS. 8-9, the video wall (10) system of the present disclosure may be configured for use in a mobile setting. For instance, as shown in FIG. 8, the video wall (10) may be comprised of a plurality of display screens (12, 14) mounted to a cabinet (40). As shown in FIG. 8, three display screens are mounted side-by-side together on the cabinet (40), each display being positioned in a portrait orientation; however, one skilled in the art would appreciate that any number of display screens may be mounted on a cabinet, depending on the size of the cabinet and the size and placement of the displays. The cabinet (40) is mounted on casters or wheels to allow for the cabinet (40), together with the displays (12, 14) mounted thereon, can be easily transported or moved around. This may be advantageous to a user desiring to move the cabinet (40) room to room, such as from one classroom to another at a school, or to different geographic locations, such as in the context of a set that moves between trade shows, theatrical presentations, musical concerts, and the like. The cabinet (40) is prewired with electrical and data connections for supporting the display screens (12, 14), and contains a computer or central processor for providing content to the display screens The data connections may be an HDMI or USB connection, though may be any suitable wired or wireless connection.

As shown in FIG. 9, two or more cabinets may be coupled or connected together to create an even larger mobile video wall. As shown specifically in FIG. 9, three cabinets (40, 42, 44) are connected to one another to form a larger video wall. With three cabinets (40, 42, 44) connected together, each cabinet hosting three displays, a video wall of nine or more display screens quickly can be configured. Each cabinet is prewired with an electrical and a data connection, and each cabinet can be plugged in one to the next to allow the display screens on multiple cabinets to be interconnected.

The multi-panel video wall and system of the present disclosure may be used for a variety of other business, personal, and entertainment purposes. Some non-limiting examples include restaurants such as quick-service restaurants (QSR) and bars or taverns, hotel or airline check-in environments, gaming environments, on-premise gambling environments such as at sports arenas or racetracks, automated banking teller environments, wayfinding applications and environments such as in a building or mall or on a campus, building security applications and environments, among other purposes and applications throughout the restaurant, hospitality, transportation, education, healthcare, banking, gaming, gambling, entertainment, and many other industries and markets. In each of these environments, the video wall may display a panoramic video when acting in a default or resting mode, but one or more individual display screens may seamlessly transition away from the video wall upon interaction with or detection of a customer, thereby launching a separate environment (such as an airline check-in environment) for the customer on a particular display screen.

Figure 6:
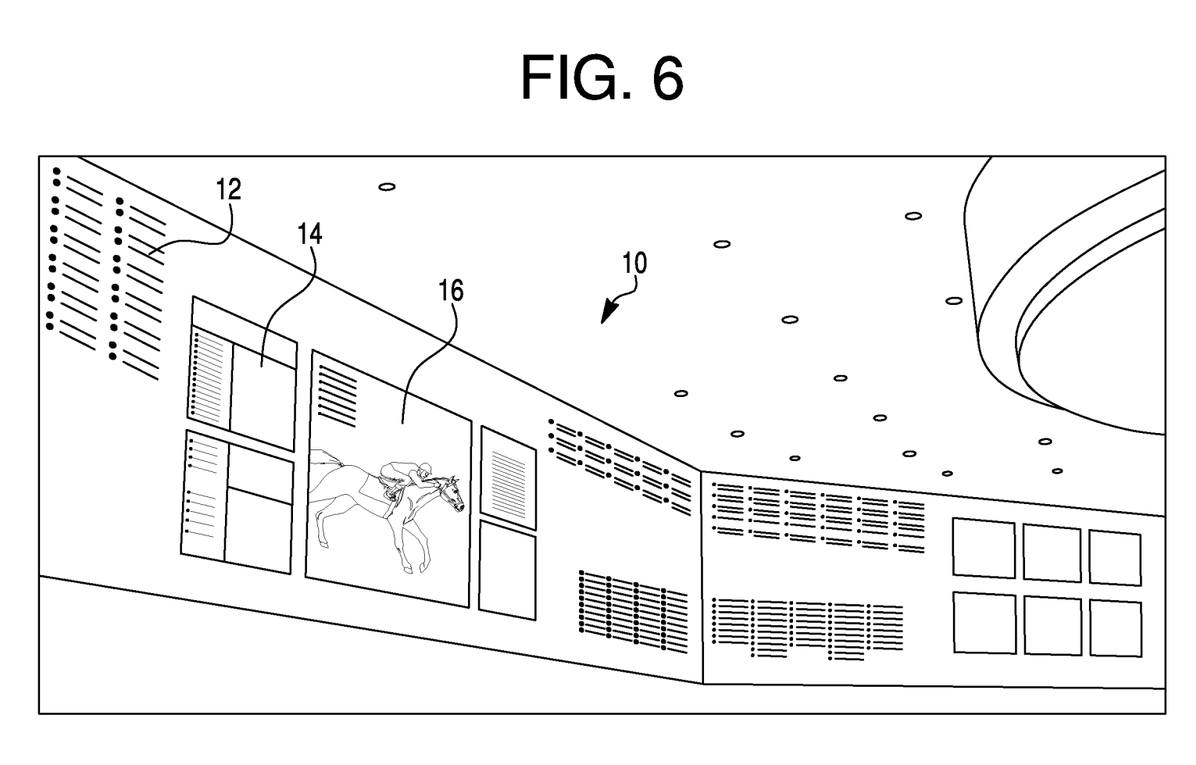
FIG. 6 depicts an exemplar multi-panel video wall system, in which one or more groups of panels are configured for use in a sports betting environment.

As one particular example, the video wall system of the present invention may be configured for use at a sports arena for on-premise gambling, as generally shown in FIG. 6. In this specific example, a video wall (10) comprising a plurality of video display screens (12, 14, 16), such as that shown in FIG. 1, may be located in a sports arena, such as along a corridor. One or more of the video display screens (12, 14, 16) may include a camera (30), configured to work with facial recognition software, as well as a payment device and/or bar code reader (32, 34). In a rest or default mode, the video wall (10) may display a panoramic video, which may be advertising such as a commercial, or may be a live camera feed of the sporting event taking place at the arena such as a basketball game. When a user desires to engage with the video wall (10), such as to engage in gambling or place a bet, the user touches or otherwise engages with the video wall, in which the video wall seamlessly transitions from the default panoramic video or live feed to an interactive user environment, where each display screen (12, 14, 16) acts as a stand-alone environment for interacting with a separate user. Camera (30) may be configured to interact with facial recognition software to determine whether the user is of minor age and prevent the child user from accessing the interactive video environment. The user may be required to scan using MSR (32) a card (e.g., a magnetic stripe or RFID card) containing gambling tokens or credits, or user identification information, in order to proceed with the interactive user environment. The user may be further required to scan using bar code reader (34) a government-issued identification card, such as a driver's license, to proceed with the interactive user environment. Upon accessing the interactive user environment, the user may be presented with options for placing bets on sporting events, such as a sports book, among other forms of on-premise gambling. The user may be able to place such bets using the interactive user environment, which the user pays for using a gaming card, tokens, or credits, and then the system may print out a receipt of the user's bets using a network or cloud-connected printer, which may be connected to the video wall (10) via a USB or similar connection, or may be located at some other place, such as a ticket counter or sports betting counter at the sports arena. Upon completion of the interactive gambling experience, or upon such timeout after the user stops interaction with the display screen, the video wall (10) seamlessly transitions back to the panoramic video presentation. The example of an interactive gambling environment may be configured for use in any number of sporting events, arenas, and racetracks, including, as yet another example, at a horsetrack environment, in which the video wall (10) supplants traditional betting windows by allowing users to engage with display screens (12, 14, 16) to place horse bets before broadcasting live footage of the horse race across the entire video wall (10).

As another particular example, the video wall system of the present invention may be configured for use to provide wayfinding on a college campus. In this specific example, a video wall (10) comprising a plurality of display screens (12, 14, 16) may be located on a campus in much the same way that a map or directory may be placed. In the default or rest mode, the video wall (10) may display a panoramic video of the campus or university, or advertising such as a commercial. When a user desires to engage with the video wall (10), such as to find a building or locate a faculty member's office, the user touches or otherwise engages with the video wall, in which the video wall seamlessly transitions from the default panoramic video to an interactive user environment, where each display screen (12, 14, 16) acts as a stand-alone environment for facilitating a directory or wayfinding purposes. In the stand-alone interactive environment, a user may look up certain buildings or landmarks, or the address of a faculty member, as examples, and then be provided with a visual map or directions to find the desired location. The interactive environment may include panoramic video, displayed only on the particular display screen (12, 14, 16) in which the user is interacting, showing the desired location or the pathway to find the desired location. An interactive environment for wayfinding may be configured for any large space, such as a mall, corporate tower or building, hotel or recreational space, airport, among many other locations.

Figure 7:
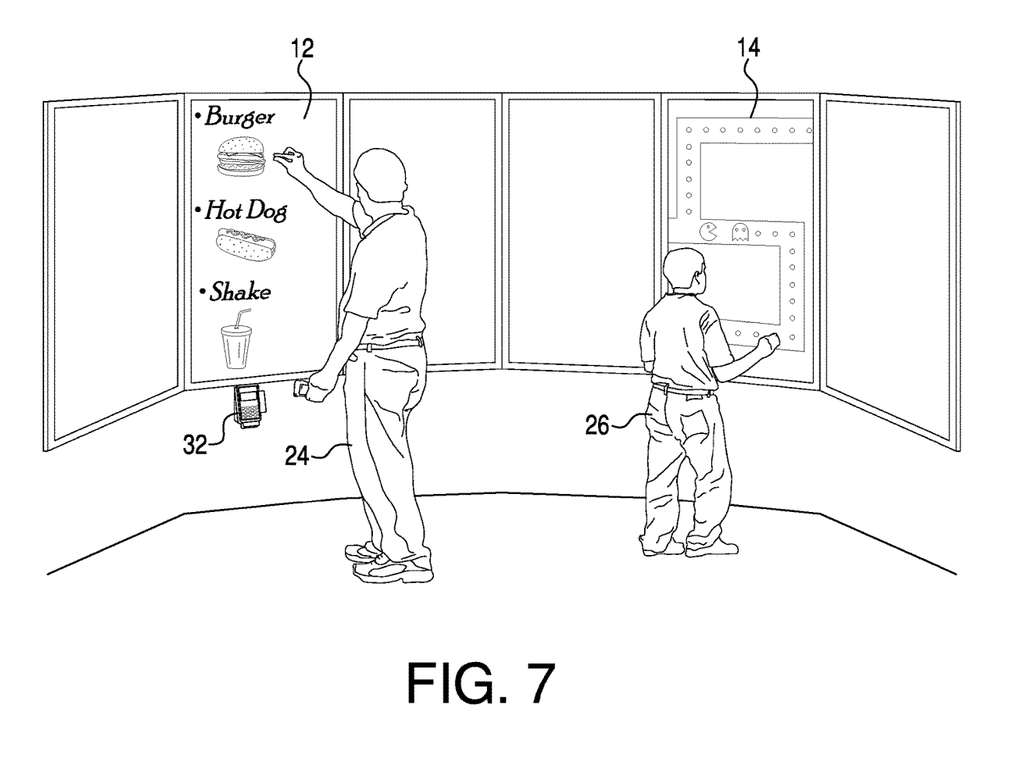
FIG. 7 depicts an exemplar multi-panel video wall system, in which one or more panels are configured for use in a quick-service restaurant (QSR) environment.

As yet another particular example, the video wall system of the present invention may be configured for use to facilitate quick-service restaurant (QSR) functionality, as shown in FIG. 7. For example, if the video wall is displayed in a QSR, all of the displays may work together to broadcast a commercial or panoramic video customized to the particular venue. When a user or customer steps up to one particular display and touches it, that individual display seamlessly transitions away from the video wall to a menu or ordering environment, in which the user can interact with that particular display screen to order food. As shown in FIG. 7, the individual display screens work independently in one or more separate user environments when the display screens transition to a stand-alone mode. For instance, one user (24) may interact with an individual display screen (12) to interact with a food ordering or menu application, in which the user (24) orders entrees and beverages at a QSR. At the same time, another user (26), who may be a child, may interact with another individual display screen (14) to engage in a separate user application or environment, such as a video gaming environment. When both users (24, 26) have completed their interaction with the individual display screens (12, 14), the entire video wall (10) may seamlessly transition back to a panoramic video display across all of the screens, as shown in FIG. 1.

As still another particular example, the video wall (10) system of the present invention may be configured for use at a sports arena, such as a ballpark like Wrigley Field. In the sports arena environment, in a default mode, the video wall (10) may display videos pertaining to the arena, the team, or to certain sponsors, among other video content. When users (24, 26) step up to the wall and touch or otherwise interact with an individual display screen (12, 14), the users may be able to scan their tickets using a barcode reader, thereby being presented with wayfinding to locate their seats. For instance, after a user scans a seat ticket, the display may present to the user a certain QR code, or similar, for being read by a user's smart phone, which then provides the user with turn-by-turn instructions for finding his or her seat. Users also may be able to upgrade their seats to a better location, using the credit card reader for payment, or may be able to trade in and/or purchase tickets to other seats at the same game or at a future game or event. Alternatively, the user may be able to access other ticket options, such as through ticket broker services like StubHub® or through season ticket holder exchanges, which are accessed through the video display screen. A user also may be to pre-order food or concessions for delivery to his or her seat, by scanning a seat ticket and using a menu application on the display screen (12, 14) to select food, beverages, or other concessions, as well as specifying the time when he or she desires that the food be delivered. For example, a user may set up prior to a baseball game an order for food and beverages to be delivered seatside after the third inning.

The display screens (12, 14) may provide the users (24, 26) with certain targeted advertising, or more in-depth advertising. For instance, the video wall (10) may include the logos of various sponsors of the venue and team, and when a user touches on a particular logo, a fly-out window is displayed on one or more of the display screens (12, 14), containing additional content about the advertiser, such as a description as to what the sponsor provides to the sports arena, along with links to allow the user to view additional content or to purchase certain sponsored products. For instance, in the example of a video wall (10) at Wrigley Field, the logo of flush valve manufacturer and sponsor SLOAN® may be shown, and upon clicking on the logo, the user may be presented with information, in a fly-out window, about SLOAN® Park, and may be further presented with an opportunity to purchase tickets to Spring Training games at SLOAN® Park, or to sign up for future information to be delivered by email or text. As another example, the video wall (10) may provide the user with availability at restaurants within the sports arena, and may allow the user to place him or herself on a waiting list at the restaurant. Alternatively, the video wall (10) may act to drive traffic to underutilized restaurants by providing the user with an instant coupon or discount at the underutilized restaurant, either in the form of a ticket or coupon that is printed out at the video wall location or electronically by associating the discount with the user's ticket, email, phone number, among other identifiers.

As still yet another particular example, the video wall (10) system of the present invention may be configured for use in a box or suite at a sports arena, where particularized information may be delivered to the occupants of the box or suite pertaining to the venue, team, or overall box seating experience. For instance, a user (24, 26) may approach the video wall (10), which might ordinarily be displaying a live feed of the game on the video wall. When the user touches or interacts with an individual display screen (12, 14), the video wall may transition from the live-feed video of the game to certain content options, providing the user with certain functionality that may enhance the box seating experience. For example, a user may be provided with a link or icon for ordering food or beverage. When the user clicks on that link or icon, the user is then provided with content, in a stand-alone display or in a fly-out window, for browsing and ordering food or beverage, which the user can pay for directly at the point of sale using a credit card reader or other payment device. This allows the user to pay for the particular food and beverage individually, as opposed to the food or beverage being added to the box or suite's tab. The user also may to access other individualized content. For instance, a user may be presented with links or icons for other live-TV feeds, such as other sporting events taking place at that same time, or certain curated social media live feeds, such as the official Instagram® page of the team or sports arena venue. If a user touches or clicks on the link or icon for other live-TV feeds, the user may be able to watch, in a fly-out window, live video of another sports game, such as a user desiring to watch the White Sox game while standing in a box at a Cubs game, among other examples. If a user touches or clicks on the link or icon for social media content, the user may be able to browse, in a fly-out window, certain curated social media feeds, and interact with such feeds by posting photos or videos taken by a camera connected to the video wall (10) of the users in the box seating environment while they are cheering on their team.

As still yet another particular example, the video wall (10) system of the present invention may be configured for use in a movie theater environment. In a default mode, the video wall (10) may be playing movie clips or trailers, coming attractions, or the like. Upon interaction with a user, one or more display screens (12, 14) may seamlessly transition from the video wall mode to an interactive mode wherein the user can review ticket options and make purchases and selections, select seats, change or upgrade seating options, purchase concessions and arrange for the delivery of the concessions to the user's seat at a desired time (e.g., after previews have played). The video wall (10) also may provide for entertainment functionality for children, such as gaming applications, which a child may engage with while waiting for a movie showtime, or at such time when a parent is purchasing movie tickets and concessions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended set of claims.

What is claimed is:

1. A multi-panel video wall system comprising:
a computer having a memory containing a media file and a processor for executing the media file, the computer having an Internet connection for access to a remote Javascript database;
a plurality of display panels interconnected to one another and to the computer, each of the plurality of display panels configured to work together to display a video content generated from the media file that extends across all of the plurality of display panels, and each such display panel configured to operate independently from one another to display one or more separate video contents generated from the media file;

wherein one or more of the plurality of display panels are configured to seamlessly transition away from the video content upon detection of a user to display a separate video content for interaction with the user.

2. The multi-panel video wall system of claim 1 wherein the computer memory contains front end software for displaying the media file and back end software for pulling instructions and content from the Javascript database, and upon detection of a user, the back end software is configured to instruct the front end software to display the separate interactive video content.

3. The multi-panel video wall system of claim 2 wherein the back end software contains one or more Javascript components and the front end software is configured to pull instructions from at least one Javascript component through which the back end software is configured to serve the separate interactive video content.

4. The multi-panel video wall system of claim 1 wherein one or more of the plurality of display panels includes a masked region on the surface of the screen for interaction with a user, said masked region configured to toggle the display of video content on the video wall system from a first video content to a second video content.

5. The multi-panel video wall system of claim 1 wherein the media file is stored remotely.

6. The multi-panel video wall system of claim 5 wherein the computer is configured to download the media file to the memory prior to display of the video content.

7. The multi-panel video wall system of claim 5 wherein the computer is configured to stream the video file at the time of display of the video content.

8. The multi-panel video wall system of claim 1 further comprising at least one camera operatively connected to one or more of the plurality of video display screens, the camera configured to detect one or more physical characteristics relating to the user.

9. The multi-panel video wall system of claim 8 wherein the computer is configured to select separate video content based on one or more of the detected physical characteristics relating to the user.

10. The multi-panel video wall system of claim 8 wherein the computer is configured to restrict certain video content to the user based on one or more of the detected physical characteristics relating to the user.

11. A method for displaying a separate interactive video content on a display screen to a user, the display screen being one of a plurality of display panels forming a video wall, the method comprising the steps of:

providing a computer having a memory containing a media file and a processor for executing the media file, the computer being interconnected with the plurality of display panels and having an Internet connection for accessing a remote Javascript database;

displaying a video content across all of the plurality of display panels, the video content generated from the media file;

detecting a user interacting with one of the plurality of display panels and seamlessly transitioning said one of the plurality display panels from the video content to a separate video content for interaction with the user; and displaying the separate interactive video content on said one of a plurality of video display panels interacting with the user.

12. The method of claim 11 further comprising the step of storing the media file in a remote storage device operatively connected with the computer.

13. The method of claim 12 wherein the computer downloads the media file to the memory prior to displaying the video content.

14. The method of claim 12 wherein the computer streams the media file at the time of displaying the video content.

15. The method of claim 11 wherein the user is detected using a badge or user identification presented by the user.

16. The method of claim 15 wherein the computer restricts certain video content presented to the user based on the identification of the user.

* * * * *